United States Patent Office 3,577,432
Patented May 4, 1971

3,577,432
1-SUBSTITUTED-3-PHENOXYPYRROLIDINES
Grover Cleveland Helsley, Richmond, Va., assignor to A. H. Robins Company, Incorporated, Richmond, Va.
No Drawing. Filed Dec. 23, 1968, Ser. No. 786,383
Int. Cl. C07d 27/04
U.S. Cl. 260—326.3     15 Claims

ABSTRACT OF THE DISCLOSURE 1-substituted-3-phenoxypyrrolidines useful as muscle relaxants, anti-convulsants and major tranquilizers are disclosed. The compounds are prepared from 3-phenoxypyrrolidines.

---

The present invention relates to 3-phenoxypyrrolidines and more particularly to 3-phenoxy-1-substituted-pyrrolidines, their acid addition salts and to methods of making and using them.

The compounds of the present invention may be broadly illustrated by the following structural formula:

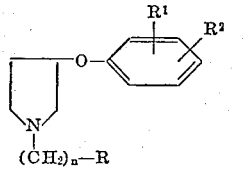

Formula I wherein;

R represents lower alkyl, lower alkoxy, lower-alkenyl, lower-alkynyl, carbamoyl, carbamoyloxy, phenoxy, benzoyloxy, α-hydroxybenzyl, styryl, hydroxy, 1,2-dihydroxyethyl, amidino, carbalkoxy, and phenyl when $n$ is zero.

$R^1$ and $R^2$ represent hydrogen, lower alkyl, lower alkoxy, trifluoromethyl, acetyl and halogen having an atomic weight less than 80.

$n$ is a positive integer from zero to four inclusive and acid addition salts thereof.

The compounds of the invention are useful because of their pharmacological action on the central nervous system. The activity is demonstrable when the compounds are used in the form of the free base or in the form of their non-toxic acid addition salts. The preferred form of the compounds is as their non-toxic acid addition salts for increased water solubility and ease of administration.

The compounds of the invention are specifically useful in the field of comparative pharmacology. When the 1-substituted 3-phenoxypyrrolidines are used and compared with other drugs as major tranquilizers by the method of DaVanzo, J. P. et al., Psychopharmacologia 9, 210 (1966), and in particular the compounds of Examples 57 and 58, 1 - [3 - (4-fluorophenoxy)propyl]-3-(2-methoxyphenoxy)pyrrolidine maleate and 1-[4-(4-fluorophenoxy)-butyl]-3-(2-methoxyphenoxy)pyrrolidine hydrochloride, they demonstrate this action best when utilized at a dose (intraperitoneally in mice) within the range of about 2–100 mg./kg. and preferably 2–25 mg./kg. Furthermore, when the 1-substituted-3-phenoxy-pyrrolidines are used in the field of comparative pharmacology and compared with other drugs as muscle relaxants, and in particular the compounds of Examples 28 and 59, 1-ethylcarbamoyl-3-(3-trifluoromethylphenoxy)pyrrolidine and 1-(2,3-dihydroxypropyl)-3-(3,5-dimethylphenoxy)pyrrolidine, they will demonstrate this effect best against comparable drugs using a modified method of the flexor-reflex technique of Carroll, M. N. et al., Arch. Int. Pharmacodyn. CXXX, No. 3–4, 280 (1961), at an intravenous dose in cats of about 5–100 mg./kg. and preferably at a dose of 5–50 mg./kg. When the compounds of the invention are used and compared with other drugs as anticonvulsants in cats using the supramaximal electroshock seizure technique of Toman, J. E. P. et al., Neurophysiol, 9, 47 (1946), they will demonstrate this effect best at a dose level of 25–200 mg./kg. intravenously and preferably at a dose of 25–125 mg./kg. Among the compounds tested for anti-convulsant effect, those of Examples 30 and 31, 1-carbamoyl-3-(3-trifluoromethylphenoxy)pyrrolidine and 1-methylcarbamoyl-3-(3-chlorophenoxy)pyrrolidine are preferred.

It is, therefore, an object of this invention to provide novel 1-substituted-3-phenoxypyrrolidines having utility as major tranquilizers, muscle relaxants and anti-convulsants. Another object is to provide methods for producing the novel compounds and methods for the utilization thereof. Other objects of this invention will be apparent to one skilled in the art and still other objects will become apparent hereinafter.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. "Lower alkoxy" has the formula -O-lower-alkyl. The term "lower-alkenyl" includes straight and branched chain radicals of two to eight carbon atoms inclusive and is exemplified by such groups as vinyl, allyl, methallyl, 4-pentenyl, 3-hexenyl, and 3-methyl-3-heptenyl. The term "lower alkynyl" includes straight and branched chain radicals of two to eight carbon atoms inclusive and is exemplified by such groups as propynyl, butynyl, pentynyl, and hexynyl.

When halogen is referred to herein, preferably but not necessarily a halogen of atomic weight less than eighty is employed.

The term "carbamoyl" includes not only the primary amino-containing carbamoyl radicals, but also the corresponding N-phenylcarbamoyl, N-(lower-alkyl-carbamoyl, N,N-di-(lower-alkyl)carbamoyl radical, and the N,N-diphenyllower-alkylcarbamoyl radical. The term "carbamoyloxy" has the formula -O-carbamoyl.

By "phenyl" is meant the unsubstituted and substituted phenyl radical. Among the suitable substituted phenyl radicals are phenyl radicals substituted by any radical or radicals which are not reactive or otherwise interfering under the conditions of reaction, such as lower-alkoxy, lower-alkyl, trifluoromethyl, halo, and the like. The substituted-phenyl radicals have preferably no more than one to three substituents such as those given above and, furthermore, these substituents can be in various available positions of the phenyl nucleus and, when more than one substituent is present, can be the same or different and can be in various position combinations relative to each other. The lower-alkyl and lower-alkoxy substituents have preferably from one to four carbon atoms which can be arranged as straight or branched chains. A total of nine carbon atoms in all ring substitutents is the preferred maximum. The term "phenoxy" has the formula —O-phenyl.

The compounds of Formula I may be converted to and are most conveniently employed in the form of non-toxic pharmaceutically acceptable acid addition salts. Such salts also have improved water solubility. Although the non-toxic salts are preferred, any salt may be prepared for use as a chemical intermediate, as in the preparation of another but non-toxic acid addition salt. The free basic compounds of Formula I may be conveniently converted to their acid addition salts by reaction of the free base with the selected acid, preferably in the presence of an organic solvent inert to the reactants and reaction products under the conditions of the reaction. The acids which can be used to prepare the preferred non-toxic acid addition salts are those which produce, when combined with the free base, salts, the anions of which are relatively innocuous to the animal organism in therapeutic doses of the salts, so that beneficial physiological properties inherent in the free bases are not vitiated by side effects ascribable to the anions.

Appropriate acid addition salts are those derived from mineral acids such as hydrochloric acid, hydrobromic acid, hydriodic acid, nitric acid, sulfuric acid, and phosphoric acid; and organic acids such as maleic acid, oxalic acid, lactic acid, fumaric acid, and tartaric acid. The preferred acid addition salt is the hydrochloride.

The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely, the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling or in other conventional manner.

When there are two or more basic nitrogen atoms present in the compounds of the invention, poly-acid-addition salts may be obtained by employing the proper increased molar ratios of acid to the free base.

The novel compounds of the present invention are prepared from 1-benzyl-3-pyrrolidinols and 1-benzyl-3-halopyrrolidines. The foregoing compounds can be prepared by methods disclosed in U.S. Pat. 3,318,908.

Generally speaking, a 1-benzyl-3-halopyrrolidine or a 1-benzyl-3-pyrrolidinol which has been reacted with an arylsulfonyl halide to form the tosylate is reacted with the sodium salt of an appropriately substituted phenol in a solvent as, for example, dimethyl sulfoxide or dimethyl-formamide. Alternately, a substituted phenol and a 1-benzyl-3-halopyrrolidine are reacted in the presence of an excess of a metal carbonate salt, illustratively, potassium carbonate in a solvent as given hereinabove. The reactions are generally run at a temperature of from about 65° C. to about 115° C. for a period of from about two hours to about 22 hours. When the 1-benzyl-3-pyrrolidinol tosylates are reacted with phenols, the reaction generally proceeds at a greater rate, reaction temperatures are lower, usually from about 65° C. to 75° C., and the reactions are substantially complete in a shorter period of time of from about two hours to about four hours. When a 1-benzyl-3-halopyrrolidine is reacted with a phenol, generally higher reaction temperatures of from about 100° C. to 115° C. are necessary and a longer reaction period of from about 15 to about 22 hours is required to ensure completion of the reaction.

The 1-benzyl-3-phenoxypyrrolidines are isolated from the reaction mixtures by distillation or by conversion to an acid-addition salt. The purified compounds are debenzylated by hydrogenolysis in about one to three atmospheres of hydrogen and at a temperature of from about 20° C. to about 60° C. using a noble metal catalyst. The preferred catalyst is palladium (5–20%) on charcoal and in an amount of from about 3–10% by weight of the 1-benzyl-3-phenoxypyrrolidine. It is sometimes advantageous to pretreat the 1-benzyl-3-phenoxypyrrolidine with Raney nickel in a lower alkanol solvent, as for example, ethanol, to remove impurities which reduce the activity to the palladium catalyst.

Hydrogenolysis of 1-benzyl-3-phenoxypyrrolidines to 3-phenoxypyrrolidines by catalytic debenzylation is not satisfactory when halogen atoms, particularly chlorine, bromine and iodine are present as substituents of the phenoxy radical. The benzyl radical in the latter case is smoothly and conveniently removed by treating the 1-benzyl-3-phenoxypyrrolidine with cyanogen bromide. Under controlled conditions 1-carbamoyl-3-phenoxypyrrolidines can be obtained as the principal product from the cyanogen bromide reaction.

The novel compounds of Formula I, when $n$ is zero, and in particular the carbamoyl compounds which are more fully disclosed hereinafter, are prepared from the 3-phenoxypyrrolidine intermediates obtained as described above by reaction with nitrourea, lower-alkyl isocyanates, phenyl isocyanates, N,N-di-lower-alkyl carbamoyl halides, N,N-diphenyl carbamoyl halides and the like. The reactions are generally run in dry non-reactive organic solvents as, for example, benzene, ethanol and chloroform. The reactions are usually run at or about room temperature. When nitrourea is used as one of the reactants, refluxing conditions are generally employed. The 1-carbamoyl-3-phenoxypyrrolidines are isolated from the reaction mixtures by evaporation of the solvent and crystallization of the residue using a suitable solvent.

Additional novel compounds within the scope of Formula I and especially compounds wherein $n$ is greater than zero; i.e., $n$ is a positive integer from one to four inclusive, are prepared by reacting 3-phenoxypyrrolidines with omega-phenoxyalkyl halides, omega-hydroxyalkyl halides, alkoxyalkyl halides, lower-alkenyl halides, 1,2-dihydroxy-3-halopropanes, and the like. The reactions are generally run in a solvent inert to the reactants at the reflux temperature of the solvent used and in the presence of an acid acceptor as, for example, an alkali metal or an alkaline-earth metal carbonate. The products are isolated by conventional laboratory techniques including distillation, crystallization and the like.

The 1-(omega-hydroxyalkyl)-3-phenoxypyrrolidines prepared as described above are useful for preparing additional compounds within the scope of Formula I. Thus, reaction with benzoyl halides, lower-alkyl isocyanates and phenyl isocyanates gives the corresponding 1-omega-benzoyloxyalkyl-, 1-omega-lower-alkyl carbamoyloxy)-, and 1-(omega-phenyl carbamoyloxy)-3-phenoxypyrrolidines. The reactions are generally carried out in a dry inert organic solvent as, for example, chlorofrom, benzene and the like and at temperatures of from about room temperature to the reflux temperature of the solvent employed and for a period of time of from about two hours to about twenty hours. The products are isolated from the reaction mixtures by evaporation of the solvent and crystallization or distillation of the residue or by conversion of the residue to an acid addition salt which may be further purified by crystallization from a suitable solvent.

The novel compounds of the present invention as represented structurally by Formula I given hereinabove are more fully exemplified by the examples hereinafter described. The examples given are for illustrative purposes only and are in no wise to be considered limiting.

EXAMPLE 1

1-benzyl-3-phenoxypyrrolidine fumarate

A solution of 317 g. (1 mole) of 1-benzyl-3-pyrrolidinol tosylate and 116 g. (1 mole) of sodium phenoxide in one liter of dimethyl sulfoxide was heated with stirring to 65° C. whereupon the reaction became exothermic and cooling became necessary for several minutes. The reaction temperature was maintained at 65° C. for one hour and then allowed to drop to room temperature while stirring overnight. The mixture was treated with one liter of water followed by 1.5 mole of 50% sodium hydroxide solution. The water insoluble oil which separated was extracted using ether and the ether extracts shaken with dilute hydrochloric acid. The acidic extracts were treated with 50% sodium hydroxide solution and the resulting free base was extracted into ether. After drying over magnesium sulfate the ether extracts were evaporated to an oil. Distillation of the oil gave 166 g. (67%) of pure product which boiled at 142–144° C./0.15 mm. The free base was converted to the fumarate salt which was recrystallized from isopropanol-isopropyl ether and melted at 120–123° C.

*Analysis.*—Calculated for $C_{21}H_{23}NO_5$ (percent): C, 68.28; H, 6.28; N, 3.79. Found (percent): C, 68.13; H, 6.32; N, 3.91.

EXAMPLE 2

1-benzyl-3-(3-trifluoromethylphenoxy)pyrrolidine hydrochloride

A mixture of 196 g. (1.0 mole) of 1-benzyl-3-chloropyrrolidine, 162 g. (1.0 mole) of 3-trifluoromethylphenol, 40 g. (1.0 mole) of sodium methoxide and one liter of dimethyl sulfoxide was stirred and heated at 112–115° C. for 16 hours. The mixture was cooled, diluted with one liter of water and treated with 80 g. (1.0 mole) of 50% sodium hydroxide solution. The basic solution was extracted with ether, the combined ether extracts washed with cold water, dried over magnesium sulfate, the ether evaporated and the residual oil distilled at reduced pressure. The light yellow oil distilled at 135–137° C/.05 mm. and weighed 94 g. (29% yield). The free base was converted to the hydrochloride which melted at 148.5–150.5° C. after crystallization from isopropanol-isopropyl ether.

*Analysis.*—Calculated for $C_{18}H_{19}ClF_3NO$ (percent): C, 60.42; H, 5.35; N, 3.92. Found (percent): C, 60.37; H, 5.39; N, 3.92.

EXAMPLE 3

1-benzyl-3-(2-methoxyphenoxy)pyrrolidine

A mixture of 102 g. (0.70 mole) of sodium guiacolate, 137 g. (0.70 mole) of 1-benzyl-3-chloropyrrolidine and one liter of dimethyl sulfoxide was heated with stirring for 16 hours at 112–115° C. The mixture was cooled, diluted with one liter of water and treated with 80 g. (1.0 mole) of 50% sodium hydroxide solution. The solution was extracted with ether, the combined extracts were washed with water and dried over magnesium sulfate. The solvent was evaporated and the residual oil was distilled at 150–152° C./.05 mm. to give 92 g. (47% yield of product.

*Analysis.*—Calculated for $C_{18}H_{21}NO_2$ (percent): C, 76.29; H, 7.47; N, 4.94. Found (percent): C, 76.41; H, 7.47; N, 5.00.

EXAMPLE 4

1-benzyl-3-(3-chlorophenoxy)pyrrolidine hydrochloride

A stirred mixture of 302 g. (1.55 mole) of 1-benzyl-3-chloropyrrolidine, 200 g. (1.55 mole) of 3-chlorophenol, 84 g. (1.55 mole) of sodium methoxide and one liter of dimethylformamide was heated at 110–113° C. for 16 hours, cooled and treated with one liter of water. The oil which separated was extracted with benzene, the combined benzene extracts were washed successively with 10% sodium hydroxide solution and water, the solvent was evaporated and the residual oil was distilled at reduced pressure yielding 232 g. (55% yield) of product (B.P. 152–155° C./0.7 mm.). The hydrochloride salt melted at 123–124° C. after it was recrystallized from isopropanol-isopropyl ether.

*Analysis.*—Calculated for $C_{17}H_{19}NOCl_2$ (percent): C, 62.97; H, 5.91; N, 4.32. Found (percent): C, 63.29; H, 6.07; N, 4.36.

EXAMPLES 5–12

The physical constants of additional 1-benzyl-3-phenoxypyrrolidines prepared in an analogous manner as shown in Examples 1–4 are given in Table I

TABLE I

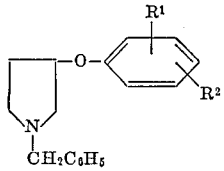

| | | | | Analysis | | | | | |
|---|---|---|---|---|---|---|---|---|---|
| | | | | Calculated | | | Found | | |
| $R^1$ | $R^2$ | Salt | M.P., B.P./mm., ° C. | C | H | N | C | H | N |
| 2-$CH_3$ | H | Maleate | 114.5–16.5 | 68.91 | 6.57 | 3.65 | 69.08 | 6.68 | 3.61 |
| 2-$OC_2H_5$ | H | do | 96–98 | 66.81 | 6.58 | 3.39 | 66.93 | 6.73 | 3.44 |
| 4-$OCH_3$ | H | do | 131–3 | 66.15 | 6.31 | 3.51 | 66.38 | 6.48 | 3.41 |
| 4-F | H | Hydrochloride | 147–8 | 66.33 | 6.22 | 4.55 | 66.60 | 6.28 | 4.62 |
| 3-$CH_3$ | 5-$CH_3$ | do | 158–60.5 | 71.79 | 7.61 | 4.41 | 71.64 | 7.58 | 4.45 |
| 3-$OCH_3$ | H | Maleate | 138–9.5 | 66.15 | 6.31 | 3.51 | 66.29 | 6.46 | 3.50 |
| 4-Cl | H | Hydrochloride | 158–9 | 62.97 | 5.91 | 4.32 | 62.99 | 5.90 | 4.32 |
| 4-Br | H | do | 156–8 | 55.38 | 5.19 | 3.80 | 55.10 | 5.19 | 3.91 |

EXAMPLE 13

3-(2-methoxyphenoxy)pyrrolidine hydrochloride

A solution of 85.0 g. (0.3 mole) of 1-benzyl-3-(2-methoxyphenoxy)pyrrolidine in 300 ml. of 95% ethanol and 8 g. of Raney nickel was shaken several hours and then filtered. Ten grams of 10% paladium-on-charcoal catalyst was added to the filtrate and the mixture was shaken in three atmospheres of hydrogen at 60° C. until one equivalent of hydrogen was absorbed. The suspension was cooled, filtered and the solvent evaporated at reduced pressure. The residual oil was distilled and the fraction which distilled at 91–93° C./.05 mm. was collected. The water-white, non-viscous oil weighed 48.3 g. (83% yield.) The hydrochloride salt was prepared and recrystallized from an isopropanol-isopropyl ether mixture; the pure salt melted at 123–124.5° C.

*Analysis.*—Calculated for $C_{11}H_{16}NO_2Cl$ (percent): C, 57.51; H, 7.02; N, 6.10. Found (percent): C, 57.70; H, 7.19; N, 6.18.

EXAMPLE 14

3-phenoxypyrrolidine hydrochloride

Two separate solutions of 83 g. (0.655 mole-total) of 1-benzyl-3-phenoxypyrrolidine in 250 ml. of 95% alcohol were shaken with Raney nickel for four hours, filtered and shaken in three atmospheres of hydrogen using 10% palladium-on-charcoal catalyst. Both solutions took up the theoretical amount of hydrogen in two hours. The two solutions were combined, concentrated under reduced pressure and the residual oil distilled in vacuo. Distillation gave 88.6 g. (82% yield) of pure product which distilled at 79–83° C./0.02 mm. The hydrochloride salt was prepared and recrystallized from isopropanol-isopropyl ether; M.P. 89–91° C.

*Analysis.*—Calculated for $C_{10}H_{14}ClNO$ (percent): C, 60.15; H, 7.07; N, 7.02. Found (percent): C, 60.06; H, 7.28; N, 7.05.

EXAMPLE 15

3-(3-trifluoromethylphenoxy)pyrrolidine hydrochloride

A solution of 74 g. (0.23 mole) of 1-benzyl-3-(3-trifluoromethylphenoxy)pyrrolidine in 100 ml. of absolute ethanol was treated with about 6 g. of Raney nickel and the mixture was shaken for 16 hours and filtered. Eight grams of 10% palladium-on-charcoal catalyst was added to the filtrate and the mixture was shaken in three atmospheres of hydrogen at 60° C. until one equivalent of hydrogen was absorbed. After cooling, the suspension was filtered and the solvent evaporated. The residual oil was distilled at reduced pressure and the fraction distilling at 62–65° C./.05 mm. collected. The white-water, non-viscous oil weighed 39.1 g. (74% yield). The white crystalline hydrochloride melted at 91–94° C. after crystallization from isopropanol-isopropyl ether.

*Analysis.*—Calculated for $C_{11}H_{13}ClF_3NO$ (percent): C, 49.35; H, 4.89; N, 5.23. Found (percent): C, 49.31; H, 5.06; N, 5.46.

EXAMPLE 16

3-(4-fluorophenoxy)pyrrolidine hydrochloride

A mixture of 20 g. (0.074 mole) of 1 benzyl-3-(4-fluorophenoxy)pyrrolidine and Raney nickel catalyst in 150 ml. of 95% ethanol was shaken for two hours. The mixture was filtered, 10 grams of 10% palladium-on-charcoal catalyst was added to the filtrate, and the mixture was shaken on the Parr apparatus in three atmospheres of hydrogen for 45 minutes, the theoretical amount of hydrogen being absorbed. The mixture was filtered, concentrated, the residue dissolved in 100 ml. of chloroform and extracted with 3 N hydrochloric acid. The aqueous acidic layer was made basic and extracted with ether. The ether extracts were dried and concentrated, yielding a pale yellow oil weighing 11.1 g. (83%). The hydrochloride salt was made and recrystallized from isopropanol to give 3-(4-fluorophenoxy)pyrrolidine hydrochloride which melted at 119–121° C.

*Analysis.*—Calculated for $C_{10}H_{13}ClFNO$ (percent): C, 55.18; H, 6.02; N, 6.44. Found (percent): C, 55.18; H, 6.06; N, 6.35.

EXAMPLE 17

3-(3-chlorophenoxy)pyrrolidine hydrochloride

A benzene solution containing 1-carbamoyl-3-(3-chlorophenoxy)pyrrolidine was concentrated to an oil and treated with 400 ml. of concentrated hydrochloric acid at reflux temperature for 64 hours. The acidic reaction mixture was cooled, made basic with 50% sodium hydroxide, the base insoluble oil was extracted with benzene, and the combined benzene extracts were washed with water, the benzene was evaporated and the residual oil was distilled at reduced pressure with the fraction distilling at 101–103° C./.07 mm. collected. The non-viscous, colorless oil weighed 28.6 g. (21% yield). The crystalline hydrochloride salt melted at 95–97° C. after it was recrystallized from an isopropanol-isopropyl ether mixture.

*Analysis.*—Calculated for $C_{10}H_{13}NOCl_2$ (percent): C, 51.30; H, 5.60; N, 5.98. Found (percent): C, 51.12; H, 5.57; N, 6.07.

EXAMPLES 18–26

The physical constants of additional 3-phenoxypyrrolidines prepared in an analogous manner as shown in Examples 13–17 are given in Table II.

TABLE II

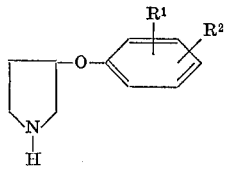

| R¹ | R² | Salt | M.P., B.P./ mm.,° C. | Calculated C | H | N | Found C | H | N |
|---|---|---|---|---|---|---|---|---|---|
| 2-CH₃ | H | Maleate | 94–97 | 61.42 | 6.53 | 4.78 | 61.18 | 6.37 | 4.76 |
| 4-OCH₃ | H | Hydrochloride | 130.5–2.5 | 57.51 | 7.02 | 6.10 | 57.11 | 6.90 | 6.27 |
| 2-OC₂H₅ | H | Maleate | 70–73 | 59.43 | 6.55 | 4.33 | 59.13 | 6.62 | 4.37 |
| 2-OC₃H₇ | H | do | 72–75 | 60.52 | 6.87 | 4.15 | 59.51 | 6.80 | 4.34 |
| 4-Cl | H |  | 135–8 | 50.09 | 4.90 | 4.87 | 50.14 | 4.92 | 4.82 |
| 4-Br | H | Hydrochloride | 144–5 | 43.12 | 4.70 | 5.03 | 42.89 | 4.69 | 5.02 |
| 3-OCH₃ | H | do | 110–12.5 | 57.51 | 7.02 | 6.10 | 57.23 | 7.14 | 6.48 |
| 3-CH₃ | 5-CH₃ | do | 133–5 | 63.29 | 7.97 | 6.15 | 63.39 | 7.94 | 6.25 |
| 2-OCH₃ | 4-COCH₃ | do | 173–5 | 57.46 | 6.68 | 5.16 | 57.44 | 6.77 | 5.38 |

EXAMPLE 27

1-carbamoyl-3-(2-methoxyphenoxy)pyrrolidine

A mixture of 5.8 g. (0.03 mole) of 3-(2-methoxyphenoxy)pyrrolidine, 4.2 g. (0.04 mole) of nitrourea and 25 ml. of 95% ethanol was stirred at 50° C. for 20 minutes until the evolution of gas ceased. The ethanol was evaporated at reduced pressure and the residue was recrystallized from an ethyl acetate-isopropanol mixture. The white crystalline product which weighed 4.0 g. (57% yield) melted at 145–147° C. The recrystallized compound melted at 147–148° C. (heated rapidly). When heated slowly the crystalline product softened at 147° C. and melted at 150–152° C.

*Analysis.*—Calculated for $C_{12}H_{16}N_2O_3$ (percent): C, 61.00; H, 6.83; N, 11.86. Found (percent): C, 60.94; H, 6.78; N, 11.94.

EXAMPLE 28

1-ethylcarbamoyl-3-(3-trifluoromethylphenoxy) pyrrolidine

To a stirred solution of 2.0 g. (0.009 mole) of 3-(3-trifluoromethylphenoxy)pyrrolidine in 15 ml. of dry benzene was slowly added a solution of 0.65 g. (0.009 mole) of ethyl isocyanate in 15 ml. of dry benzene. After the addition was completed, the solution was stirred 30 minutes at room temperature. The benzene was evaporated and the residual oil which crystallized on standing was recrystallized twice from an isopropyl ether-isooctane mixture. The white crystalline product melted at 77–79° C. and weighed 1.1 g. (42% yield).

*Analysis.*—Calculated for $C_{14}H_{17}N_2O_2F_3$ (percent): C, 55.64; H, 5.67; N, 9.27. Found (percent): C, 55.57; H, 5.69; N, 9.27.

EXAMPLE 29

1-carbamoyl-3-(3-chlorophenoxy)pyrrolidine

To a stirred solution of 89 g. (0.85 mole) of cyanogen bromide in 600 ml. of chloroform was added over a period of four hours, 204 g. (0.07 mole) of 1-benzyl-3-(3-chlorophenoxy)pyrrolidine. After the addition was complete, the mixture was refluxed one hour and the chloroform was evaporated at reduced pressure. The residual oil was treated with 1200 ml. of 3 N hydrochloric acid and refluxed 16 hours. The mixture was cooled and basified with a 25% sodium hydroxide solution. The oil which separated was extracted with benzene and the combined benzene extracts washed with water. The crystalline product which formed on standing was separated by filtration and recrystallized from a benzene-ethyl acetate mixture. The white product weighed 23 g. (14% yield) and melted at 160–163° C.

*Analysis.*—Calculated for $C_{11}H_{13}N_2O_2Cl$ (percent): C, 54.89; H, 5.44; N, 11.64. Found (percent): C, 54.98; H, 5.44; N, 11.56.

EXAMPLE 30

1-carbamoyl-3-(3-trifluoromethylphenoxy)pyrrolidine

A stirred mixture of 4.8 g. (0.021 mole) of 3-(3-trifluoromethylphenoxy)pyrrolidine, 2.4 g. (0.023 mole) of nitrourea and 40 ml. of 95% ethanol was refluxed until the evolution of gas ceased. After the solvent was evaporated at reduced pressure, the solid residue was recrystallized several times from an isopropyl ether-ethyl acetate mixture. The white product weighed 2.5 g. (44% yield) and melted at 145–147° C.

*Analysis.*—Calculated for $C_{12}H_{13}F_3N_2O_2$ (percent): C, 52.55; H, 4.78; N, 10.22. Found (percent): C, 52.55; H, 4.78; N, 10.22. Found (percent): C, 52.74; H, 4.88; N, 10.23.

EXAMPLE 31

1-methylcarbamoyl-3-(3-chlorophenoxy)pyrrolidine

To a stirred solution of 7.9 g. (0.04 mole) of 3-chlorophenoxy)pyrrolidine in 60 ml. of dry benzene was added slowly a solution of 2.3 g. (0.040 mole) of methyl isocyanate in 15 ml. of benzene. After the addition was complete, the mixture was stirred for two hours at room temperature. The solvent was evaporated and the residue which crystallized on cooling was recrystallized from an isooctane-benzene mixture. The white product weighed 8 g. (78% yield) and melted at 112–113° C.

*Analysis.*—Calculated for $C_{12}H_{15}N_2O_2Cl$ (percent): C, 56.59; H, 5.94; N, 11.00. Found (percent): C, 56.43; H, 5.95; N, 11.05.

EXAMPLES 32–48

The physical constants of additional 1-carbamoyl-3-phenoxy-pyrrolidines prepared in an analogous manner as shown in Examples 28–31 are given in Table III.

ene bromohydrin and 120 g. of potassium carbonate in 600 ml. of isopropanol was refluxed 16 hours. After cooling, the mixture was filtered, concentrated and the residual oil dissolved in ether. The ether solution was extracted with dilute hydrochloric acid and the two layers were separated. The aqueous layer was made basic and extracted with ether. The ether extracts were dried over anhydrous sodium sulfate, treated with charcoal, filtered and concentrated. The oil was distilled and gave 53.2 g. (53%) of product with a boiling range of 155–158° C./.16 mm. The product solidified upon standing, but the low melting solid could not be recrystallized.

*Analysis.*—Calculated for $C_{14}H_{21}NO_3$ (percent): C, 66.90; H, 8.42; N, 5.57. Found (percent): C, 66.76; H, 8.45; N, 5.43.

EXAMPLE 50

1-(2-ethoxyethyl)-3-(p-fluorophenoxy)pyrrolidine oxalate

A stirred mixture of 10.0 g. (0.055 mole) of 3-(p-fluorophenoxy)pyrrolidine, 10.7 g. (0.070 mole) of 2-bromoethyl ethyl ether, 20 g. of potassium carbonate and 200 ml. of toluene was refluxed 16 hours, cooled and treated with 100 ml. of water. The organic layer was separated, washed with water, dried over magnesium sulfate, and the solvent evaporated at reduced pressure. The oil was distilled at reduced pressure and the fraction boiling at 85–90° C./0.030 mm. collected. The colorless oil weighed 7.2 g. (51% yield). To a solution of the free base in ether was added 3.9 g. of oxalic acid dihydrate in isopropanol. The white crystalline oxalate salt weighed 7.5 g. and melted at 113–114° C.

*Analysis.*—Calculated for $C_{16}H_{22}NO_6F$ (percent): C, 55.97; H, 6.46; N, 4.08. Found (percent): C, 55.80; H, 6.46; N, 4.15.

EXAMPLE 51

1-[4-(2-ethoxy-4-acetylphenoxy)butyl]-3-(2-methoxyphenoxy)pyrrolidine oxalate

A stirred mixture of 8 g. (0.031 mole) of 3-methoxy-4-(4-chloro-n-butoxy)-acetophenone, 6 g. (0.031 mole) of 3-(2-methoxyphenoxy)pyrrolidine and 10 g. of potassium carbonate in 100 ml. of toluene was refluxed 24 hours. The mixture was cooled, filtered and the filtrate

TABLE III

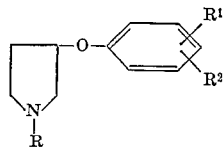

| R | R¹ | R² | M.P., B.P./mm., ° C. | Calculated C | Calculated H | Calculated N | Found C | Found H | Found N |
|---|---|---|---|---|---|---|---|---|---|
| H₂NCO | 3-CH₃ | 5-CH₃ | 166–8 | 66.64 | 7.74 | 11.96 | 66.43 | 7.91 | 11.78 |
| Same as above | 2-OC₂H₅ | H | 116–9 | 62.39 | 7.25 | 11.19 | 62.11 | 7.21 | 11.34 |
| Do | 2-OCH₃ | 4-COCH₃ | 154–6 | 60.42 | 6.52 | 10.07 | 60.18 | 6.59 | 10.00 |
| Do | 4-OCH₃ | H | 161–3 | 61.00 | 6.83 | 11.86 | 60.81 | 6.88 | 11.99 |
| Do | 3-OCH₃ | H | 182–4 | 61.00 | 6.83 | 11.86 | 60.91 | 6.86 | 11.73 |
| CH₃(H)NCO | 3-CH₃ | 5-CH₃ | 166–9 | 67.71 | 8.12 | 11.28 | 67.62 | 7.98 | 11.22 |
| C₆H₅(H)NCO | 3-CF₃ | H | 150–2 | 61.71 | 4.89 | 8.00 | 61.99 | 5.12 | 8.29 |
| CH₃(H)NCO | 3-CF₃ | H | 102–3.5 | 54.16 | 5.25 | 9.72 | 54.02 | 5.32 | 9.67 |
| Same as above | 2-OCH₃ | 4-COCH₃ | 168–70 | 61.63 | 6.90 | 9.59 | 61.73 | 6.97 | 9.55 |
| Do | Same as above | H | 156–8 | 62.38 | 7.25 | 11.20 | 62.41 | 7.18 | 11.11 |
| 4-CH₃OC₆H₄(H)NCO | do | H | 118–9.5 | 66.65 | 6.48 | 8.18 | 66.97 | 6.46 | 8.41 |
| (CH₃)₂NCO | 3-CF₃ | H | 123–5/.08 | 55.62 | 5.67 | 9.27 | 55.85 | 5.74 | 9.34 |
| (C₆H₅)₂NCO | 2-OCH₃ | H | Glass¹ | 74.20 | 6.23 | 7.21 | 74.23 | 6.42 | 7.14 |
| H₂NCO | 4-F | H | 166–7 | 58.92 | 5.84 | 12.49 | 58.87 | 5.88 | 12.52 |
| (CH₃)₂NCO | 4-F | H | 120–4/.04 | 61.89 | 6.79 | 11.10 | 61.60 | 6.88 | 10.87 |
| H₂NCO | 4-Cl | H | 172–5 | 54.89 | 5.44 | 11.64 | 55.08 | 5.45 | 11.46 |
| Same as above | 4-Br | H | 167–9 | 46.34 | 4.97 | 9.82 | 46.71 | 4.65 | 9.72 |

¹ Glass.

EXAMPLE 49

1-(3-hydroxypropyl)-3-(2-methoxyphenoxy)pyrrolidine

A mixture of 77.25 g. (0.4 mole) of 3-(2-methoxyphenoxy)pyrrolidine, 61.16 g. (0.44 mole) of trimethylwas evaporated to an oil. The crude oil was dissolved in benzene, placed in a separatory funnel and treated with 100 ml. of 3 N hydrochloric acid. Three layers formed. The lower insoluble salt layer was separated, treated with 3 N sodium hydroxide and the basic product extracted with benzene. After drying over magnesium sulfate the benzene solution was evaporated to an oil. The oil was dissolved in isopropanol and converted to the oxalate salt which melted at 125–127° C.

*Analysis.*—Calculated for $C_{26}H_{33}NO_9$ (percent): C, 62.01; H, 6.61; N, 2.78. Found (percent): C, 62.25; H, 6.43; N, 2.85.

EXAMPLE 52

1-[3-(3,4,5-trimethoxybenzoyloxy)propyl]-3-(2-methoxyphenoxy)pyrrolidine maleate While stirring a mixture of 8.4 g. (0.033 mole) of 1-(3-hydroxypropyl) - 3 - (2-methoxyphenoxy)pyrrolidine and 7 g. (0.074 mole) of sodium carbonate in 75 ml. of chloroform, a solution of 9.9 g. (0.043 mole) of 3,4,5-trimethoxybenzoyl chloride in chloroform was added dropwise. The mixture was stirred 17 hours, cooled, and 50 ml. of water was added. The separated chloroform layer was dried over sodium sulfate and concentrated. The oil was dissolved in ether, ethereal hydrochloric acid was added, followed by water to dissolve the ether insoluble hydrochloride salt. The mixture was shaken, the layers separated and the aqueous acidic layer was made basic with sodium hydroxide solution. The base insoluble oil was extracted with ether, the ether extracts dried over sodium sulfate and concentrated to give 10.1 g. (69%) of product. The maleate salt was made using isopropanol-isopropyl ether. The salt was recrystallized from isopropanol and after drying under vacuum melted at 99–101° C.

*Analysis.*—Calculated for $C_{28}H_{35}NO_{11}$ (percent): C, 59.88; H, 6.28; N, 2.49. Found (percent): C, 59.76; H, 6.41; N, 2.68.

EXAMPLE 53

1 - [3 - (N - methylcarbamoyloxy)propyl] - 3 - (2-methoxyphenoxy)pyrrolidine oxalate While stirring a solution of 10.2 g. (0.0405 mole) of 1-(3 - hydroxypropyl) - 3 - (2 - methoxyphenoxy)pyrrolidine in 50 ml. of dry benzene under a nitrogen atmosphere, 3.48 g. (0.061 mole) of methyl isocyanate was added quickly. The solution was stirred four hours and concentrated. The residue was partitioned between ether. The ether layer was dried over anhydrous sodium sulfate and concentrated to give 11.5 g. (92%) of an oily residue. The oxalate salt was made using an isopropanol-isopropyl ether solvent system and it melted at 94–97° C. after it was recrystallized from isopropanol.

*Analysis.*—Calculated for $C_{18}H_{26}N_2O_8$ (percent): C, 54.26; H, 6.58; N, 7.03. Found (percent): C, 54.08; H, 6.64; N, 6.87.

EXAMPLE 54

1 - allyl - 3 - (2 - methoxyphenoxy)pyrrolidine

A stirred mixture of 10 g. (0.052 mole) of 3-(2-methoxyphenoxy)pyrrolidine and 14.5 g. of potassium carbonate in 75 ml. of absolute alcohol was treated dropwise with 5.75 g. (0.052 mole) of allyl bromide. The mixture was stirred overnight, and the alcohol insoluble materials were removed by filtration. The filtrate was concentrated and the residual oil was partitioned between benzene and water. The benzene layer was dried over magnesium sulfate and evaporated, giving a crude oil weighing 9.9 g. The oil was dissolved in benzene and chromatographed on 250 g. of 60–100 mesh magnesium silicate. Elution of the column with benzene containing increasing amounts of acetone gave 4.9 g. (41%) of pure product. A small sample of the purified product was molecularly distilled at 72–77° C./0.005 mm.

*Analysis.*—Calculated for $C_{14}H_{19}NO_2$ (percent): C, 72.07; H, 8.21; N, 6.00. Found (percent): C, 71.70; H, 8.06; N, 5.92.

EXAMPLE 55

1-carbethoxy-3-(3-trifluoromethylphenoxy)pyrrolidine

A mixture of 5 g. (0.02 mole) of 3-(3-trifluoromethylphenoxy)pyrrolidine and 6.6 g. (0.05 mole) of potassium carbonate in 25 ml. of methylene dichloride was treated with 2.2 g. (0.02 mole) of ethyl chloroformate. The mixture was cooled to 0° C. and treated with 10–15 g. of ice. The mixture was allowed to warm to room temperature and the methylene dichloride layer was separated, washed with dilute hydrochloric acid, dried over magnesium sulfate and concentrated on a rotating evaporator to an oil. The oil was molecularly distilled for analysis; yield 6.8 g. (100%).

*Analysis.*—Calculated for $C_{14}H_{16}F_3NO_3$ (percent): C, 55.44; H, 5.32; N, 4.62. Found (percent): C, 55.26; H, 5.46; N, 4.66.

EXAMPLE 56

1-amidino-3-(2-methoxyphenoxy)pyrrolidine sulfate

A mixture of 5.8 g. (0.03 mole) of 3-(2-methoxyphenoxy)pyrrolidine, 4.2 g. (0.015 mole) of 2-methyl-2-thiopseudourea and 15 ml. of 67% ethanol was stirred and refluxed until the evolution of gas ceased. The mixture was cooled and treated with 100 ml. of isopropanol. The product which crystallized was separated by filtration and recrystallized from an isopropanol-water mixture. The white crystalline compound melted with decomposition at 265–267° C. and weighed 5.5 g. (65% yield).

*Analysis.*—Calculated for $C_{24}H_{36}N_6O_8S$ (percent): C, 50.69; H, 6.37; N, 14.78. Found (percent): C, 50.70; H, 6.45; N, 14.83.

EXAMPLE 57

1-[3-(4-fluorophenoxy)propyl]-3-(2-methoxyphenoxy)pyrrolidine maleate

A stirred mixture of 11.6 g. (0.06 mole) of 3-(2-methoxyphenoxy)pyrrolidine, 14.7 g. (0.063 mole) of 3-(4 - fluorophenoxy)propyl bromide, and 17.4 g. (0.13 mole) of potassium carbonate in 125 ml. of isopropanol was refluxed for four and one half hours. After filtering and concentration of the filtrate, the residual oil was dissolved in ether, the ether extracted with dilute acid, the combined acid extracts made basic and the base insoluble oil extracted with ether. Concentration of the dried ether extracts gave 18.7 g. (90%) of basic material. The maleate salt was made and after recrystallization from isopropanol and drying for 20 hours in a vacuum over refluxing chloroform, the salt melted over the range of 78–83° C.

*Analysis.*—Calculated for $C_{24}H_{28}FNO_7$ (percent): C, 62.46; H, 6.12; N, 3.04. Found (percent): C, 62.32; H, 6.39; N, 3.14.

EXAMPLE 58

1-[4-(4-fluorophenoxy)butyl]-3-(2-methoxyphenoxy)pyrrolidine hydrochloride

A stirred mixture of 15.5 g. (0.063 mole) of 4-(4-fluorophenoxy)butyl bromide, 11.6 g. (0.06 mole) of 3-(2-methoxyphenoxy)pyrrolidine, and 17.4 g. (0.126 mole) of potassium carbonate in 125 ml. of isopropanol was refluxed 24 hours. The cooled mixture was filtered, the filtrate concentrated, the oily residue dissolved in benzene and the solution extracted with 3 N hydrochloric acid. The aqueous acidic layer and the oily hydrochloride were combined and made basic with sodium hydroxide solution. After extracting the base insoluble oil with benzene, the extracts were dried and concentrated. The 20 g. residue was placed on a magnesium silicate column and 13.3 g. (62%) of the pyrrolidine compound was eluted using an acetone-benzene mixture. The hydrochloride salt was made and recrystallized from isopropyl ether; the salt melted at 119–121° C.

*Analysis.*—Calculated for $C_{21}H_{27}ClFNO$ (percent): C, 63.71; H, 6.88; N, 3.54. Found (percent): C, 63.73; H, 6.86; N, 3.54.

EXAMPLE 59

1-(2,3-dihydroxypropyl)-3-(3,5-dimethylphenoxypyrrolidine hydrochloride

A stirred mixture of 11.5 g. (0.060 mole) of 3-(3,5-dimethylphenoxy)pyrrolidine, 6.6 g. (0.060 mole) of 3-chloro-1,2-propanediol, 20 g. of potassium carbonate and 100 ml. of n-butanol was refluxed for 16 hours, cooled, filtered, and the solvent evaporated at reduced pressure. The residual oil was converted to the hydrochloride which was recrystallized from an isopropanol-isopropyl ether mixture; the salt melted at 108–110° C. and weighed 8.6 g. (47% yield).

Analysis.—Calculated for $C_{15}H_{24}NO_3Cl$ (percent): C, 59.69; H, 8.01; N, 4.64. Found (percent): C, 59.22; H, 7.94; N, 4.47.

EXAMPLES 60–75

The physical constants of additional 1-substituted-3-phenoxypyrrolidines prepared in similar manner as shown in Examples 49–59 are given in Table IV.

tablets and ampules are examples of preferred dosage unit forms according to the invention. Each dosage unit adapted for oral administration can conveniently contain 5 to 500 mg. and preferably 20 to 200 mg. of the active ingredient, whereas each dosage unit adapted for intramuscular administration can conveniently contain 5 to 100 mg. and preferably 10 to 75 mg. of the active ingredient.

The following formulations are representative for all of the pharmacologically active compounds of the invention, but have been particularly designed to embody as active ingredient a 3-phenoxy-1-substituted pyrrolidine, and especially a pharmacologically acceptable salt thereof, for example, 1-[3-(4-fluorophenoxy) propyl]-3-(2-methoxyphenoxy)pyrrolidine as its maleate, hydrochloride or like pharmacologically acceptable salt.

(1) Capsules.—Capsules of 5, 25, and 50 mg. of active ingredient per capsule are prepared. With the higher amounts of active ingredient, reduction may be made in the amount of lactose.

TABLE IV

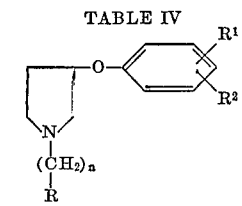

| R | R¹ | R² | n | Salt | M.P., B.P./mm., ° C. | Calculated C | Calculated H | Calculated N | Found C | Found H | Found N |
|---|---|---|---|---|---|---|---|---|---|---|---|
| $C_6H_5O$ | 2-OCH₃ | H | 2 | Maleate | 124.6 | 64.32 | 6.34 | 3.26 | 64.39 | 6.42 | 3.21 |
| 2-CH₃OC₆H₄O | Same as above | H | 2 | Fumarate | 102-4 | 62.73 | 6.36 | 3.05 | 62.87 | 6.29 | 2.99 |
| 4-CH₃CO-2-CH₃OC₆H₃O | do | H | 3 | Oxalate | 113-16 | 61.34 | 6.38 | 2.86 | 61.12 | 6.26 | 3.01 |
| Same as above | do | 4-COCH₃ | 3 | | 96-99 | 68.01 | 7.08 | 3.17 | 67.88 | 7.04 | 3.26 |
| OH | 3-CF₃ | H | 2 | Oxalate | 88-90 | 49.32 | 4.97 | 3.84 | 49.50 | 5.09 | 3.87 |
| C₆H₅C(O)O | 2-OCH₃ | H | 3 | do | 143-5 | 62.01 | 6.11 | 3.15 | 61.86 | 5.98 | 3.02 |
| Same as above | Same as above | H | 2 | do | 154-5 | 61.24 | 5.84 | 3.25 | 61.09 | 5.68 | 3.35 |
| 4-FC₆H₄C(O)O | do | H | 3 | Maleate | 107-10 | 61.34 | 5.77 | 2.86 | 61.32 | 5.70 | 3.07 |
| CH₃NHC(O)O | 3-CF₃ | H | 2 | Hydrochloride | 115-6 | 48.85 | 5.47 | 7.60 | 48.88 | 5.52 | 7.89 |
| C₆H₅NHC(O)O | 2-OCH₃ | H | 3 | Fumarate | 143-4.5 | 63.07 | 6.67 | 6.40 | 62.98 | 6.48 | 6.48 |
| HC≡C | H | H | 1 | | | 77.58 | 7.51 | 6.96 | 77.36 | 7.47 | 7.12 |
| C₆H₅ | 2-OCH₃ | 4-COCH₃ | 0 | | 155-7 | 73.29 | 6.80 | 4.50 | 73.50 | 6.86 | 4.60 |
| 4-F-C₆H₄CHOH | Same as above | H | 3 | | | 70.17 | 7.29 | 3.90 | 70.06 | 7.37 | 3.97 |
| 4-F-C₆H₄CH=CH₂ | do | H | 2 | Maleate | 95-8 | 65.63 | 6.17 | 3.06 | 65.73 | 6.20 | 3.26 |
| CH₂OHCHOH | 3-Cl | H | 1 | Hydrochloride | 94-6 | 50.66 | 6.21 | 4.54 | 50.75 | 6.17 | 4.50 |
| CH₃ | 2-OCH₃ | 5-OCH₃ | 1 | | 84-6 | 58.84 | 6.86 | 3.81 | 58.75 | 6.85 | 3.87 |
| C₂H₅OC(O) | 2-OC₂H₅ | H | 0 | | | 64.49 | 7.58 | 5.02 | 64.21 | 7.56 | 5.30 |
| H₂N—C(NH) | H | H | 0 | Sulfate | 294-6 | 51.95 | 6.34 | 16.53 | 51.73 | 6.29 | 16.51 |
| Same as above | 3-CF₃ | H | 0 | do | 280-3 | 44.72 | 4.69 | 13.04 | 44.67 | 4.85 | 13.10 |

Formulation and administration

Useful compositions containing at least one of the compounds according to the invention in association with a pharmaceutical carrier or excipient may be prepared in accordance with conventional technology and procedures. Thus, the compounds may be presented in a form suitable for oral or parenteral administration. For example, compositions for oral administration can be solid or liquid and can take the form of capsules, tablets, coated tablets and suspensions, such compositions comprising carriers or excipients conveniently used in the pharmaceutical art. Suitable tableting excipients include lactose, potato, and maize starches, talc, gelatin, and stearic, and silicic acids, magnesium stearate, and polyvinyl pyrrolidone.

For parenteral administration the carrier or excipient may be a sterile, parenterally acceptable liquid; e.g., water or a parenterally acceptable oil; e.g. arachis oil contained in ampules.

Advantageously, the compositions may be formulated as dosage units, each unit being adapted to supply a fixed dose of active ingredients. Tablets, capsules, coated Typical blend for encapsulation:  Per capsule, mg.

| | |
|---|---|
| Active ingredient, as salt | 5.0 |
| Lactose | 296.7 |
| Starch | 129.0 |
| Magnesium stearate | 4.3 |
| Total | 435.0 |

(2) Tablets.—A typical formulation for a tablet containing 5 mg. of active ingredient per tablet follows: The formulation may be used for other strengths of active ingredient by adjustment of weight of dicalcium phosphate.

Per tablet, mg.

| | |
|---|---|
| (1) Active ingredient, as salt | 5.0 |
| (2) Corn starch | 13.6 |
| (3) Corn starch (paste) | 3.4 |
| (4) Lactose | 79.2 |
| (5) Dicalcium phosphate | 68.2 |
| (6) Calcium stearate | 0.9 |
| Total | 170.3 |

Uniformly blend 1, 2 4 and 5. Prepare 3 as a ten percent paste in water. Granulate the blend with starch paste and pass the wet mass through an eight-mesh screen. The wet granulation is dried and sized throuhg a twelve-mesh screen. The dried granules are blended with the calcium stearate and compressed.

Additional tablet formulations preferably contain a higher dosage of the active ingredient and are as follows:

50 mg. tablet

| Ingredients: | Per tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, starches, and dicalcium phosphate when present. The blend is then granulated using water as a granulating medium. The wet granules are passed through an eight-mesh screen and dried at 140–160° Fahrenheit overnight. The dried granules are passed through a ten-mesh screen, blended with the proper amount of calcium stearate, and the lubricated granules then converted into tablets on a suitable tablet press.

(3) Injectable—2% sterile solution:

| | Per cc. |
|---|---|
| Active ingredient, as salt mg | 20 |
| Preservative, e.g., chlorobutanol percent weight volume | 0.5 |
| Water for injection q.s. | |

Prepare solution, clarify by filtration, fill into vials, seal, and autoclave.

Various modifications in the compounds, compositions and methods of the invention will be apparent to one skilled in the art, and may be made without departing from the spirit or scope thereof, and it is therefore to be understood that the invention is to be limited only by the scope of the appended claims.

I claim:

1. A compound selected from (a) 1-substituted-3-phenoxy-pyrrolidines having the formula:

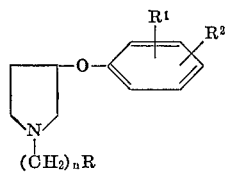

wherein;
R is selected from the group consisting of lower-alkyl, lower-alkoxy, lower-alkenyl, lower-alkynyl, carbamoyl, carbamoyloxy, phenoxy, benzoyloxy, α-hydroxybenzyl, styryl, hydroxy, 1,2-dihydroxyethyl, amidino, carbalkoxy, and phenyl when $n$ is zero, $R^1$ and $R^2$ are selected from the group consisting of hydrogen, lower-alkyl, lower-alkoxy, trifluoromethyl, acetyl and halogen having an atomic weight less than 80, $n$ is a positive integer from zero to four inclusive, and
(b) acid addition salts thereof.

2. A compound as defined in claim 1 wherein R is 1,2-dihydroxyethyl, $R^1$ and $R^2$ are methyl, and $n$ is one.

3. A compound of claim 2 wherein $R^1$ is 3-methyl and $R^2$ is 5-methyl.

4. A compound as defined in claim 1 wherein R is phenoxy, $R^1$ is lower-alkoxy, $R^2$ is hydrogen and $n$ is a positive integer from three to four inclusive.

5. A compound as defined in claim 4 wherein R is 4-fluorophenoxy, $R^1$ is 2-methoxy and $n$ is 3.

6. A compound as defined in claim 4 wherein R is 4-fluorophenoxy, $R^1$ is 2-methoxy and $n$ is 4.

7. A compound as defined in claim 1 wherein R is carbamoyl, $R^1$ is trifluoromethyl, $R^2$ is hydrogen and $n$ is zero.

8. A compound as defined in claim 7 wherein $R^1$ is 3-trifluoromethyl.

9. A compound as defined in claim 1 wherein R is N-lower-alkylcarbamoyl, $R^1$ is trifluoromethyl, R is hydrogen and $n$ is zero.

10. A compound as defined in claim 9 wherein $R^1$ is 3-trifluoromethyl.

11. A compound as defined in claim 10 wherein R is N-ethyl carbamoyl.

12. A compound as defined in claim 1 wherein R is N-lower-alkylcarbamoyl, $R^1$ is halogen, $R^2$ is hydrogen, and $n$ is zero.

13. A compound as defined in claim 12 wherein the halogen is chlorine.

14. A compound as defined in claim 13 wherein $R^1$ is 3-chloro.

15. A compound as defined in claim 14 wherein R is N-methyl carbamoyl.

References Cited

Wagner et al.: Synthetic Organic Chemistry (1953), pp. 645–47, 666–67.

ALEX MAZEL, Primary Examiner

J. A. NARCAVAGE, Assistant Examiner

U.S. Cl. X.R.

260—240, 326.5, 326.8; 424—274